US006570646B2

(12) United States Patent
Bowers

(10) Patent No.: US 6,570,646 B2
(45) Date of Patent: May 27, 2003

(54) OPTICAL DISTANCE MEASUREMENT DEVICE AND METHOD THEREOF

(75) Inventor: Mark W. Bowers, Patterson, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/801,144

(22) Filed: Mar. 6, 2001

(65) Prior Publication Data
US 2002/0154287 A1 Oct. 24, 2002

(51) Int. Cl.[7] .............................. G01C 3/08; G01P 3/36
(52) U.S. Cl. ......................... 356/5.1; 356/5.11; 356/28
(58) Field of Search ................ 356/5.1, 5.11, 356/28

(56) References Cited

U.S. PATENT DOCUMENTS

| | | | | |
|---|---|---|---|---|
| 4,093,380 A | * | 6/1978 | White ............................. 356/5 |
| 4,413,905 A | * | 11/1983 | Holzapfel ....................... 356/5 |
| 4,621,926 A | | 11/1986 | Merry et al. ................. 356/363 |
| 4,700,045 A | | 10/1987 | Merry et al. ................. 219/121 |
| 4,715,706 A | * | 12/1987 | Wang .............................. 356/5 |
| 4,744,653 A | * | 5/1988 | Sano et al. ..................... 356/5 |
| 4,790,651 A | | 12/1988 | Brown et al. ................. 356/4.5 |
| 4,907,863 A | | 3/1990 | Merry et al. ................. 350/358 |
| 5,082,364 A | | 1/1992 | Russell .......................... 356/5 |
| 5,125,736 A | * | 6/1992 | Vaninetti et al. ............... 356/5 |
| 5,164,733 A | * | 11/1992 | Nettleton et al. ............. 342/54 |
| 5,260,762 A | | 11/1993 | Telle ............................... 356/5 |
| 5,532,813 A | * | 7/1996 | Ohishi et al. ............... 356/5.01 |
| 5,534,992 A | | 7/1996 | Takeshima et al. .......... 356/5.1 |
| 5,710,621 A | * | 1/1998 | Tamura ....................... 356/5.15 |
| 5,905,576 A | | 5/1999 | Takada et al. ............... 356/373 |
| 6,133,993 A | * | 10/2000 | Labaar ........................ 356/5.09 |

FOREIGN PATENT DOCUMENTS

| | | | |
|---|---|---|---|
| EP | 0 640 846 B1 | 8/1994 | ........... G01S/17/36 |
| WO | WO 92/04596 | 3/1992 | ........... G01C/3/08 |
| WO | WO 95/06852 | 3/1995 | ........... G01C/3/08 |

OTHER PUBLICATIONS

Rogowski, et al., "An amplitude modulated laser system for distance and displacement measurement," SPIE vol. 663, Laser Radar Technology and Applications (1986), pp. 86–89.

* cited by examiner

Primary Examiner—Thomas H. Tarcza
Assistant Examiner—Brian K Andrea
(74) Attorney, Agent, or Firm—James S. Tak; Alan H. Thompson

(57) ABSTRACT

A system and method of efficiently obtaining distance measurements of a target. A modulated optical beam may be used to determine the distance to the target. A first beam splitter may be used to split the optical beam and a second beam splitter may be used to recombine a reference beam with a return ranging beam. An optical mixing detector may be used in a receiver to efficiently detect distance measurement information.

19 Claims, 3 Drawing Sheets

OPTICAL DISTANCE MEASUREMENT DEVICE AND METHOD THEREOF

The United States Government has rights in this invention pursuant to Contract No. W-7405-ENG-48 between the United States Department of Energy and the University of California for the operation of Lawrence Livermore National Laboratory.

FIELD OF THE INVENTION

This invention relates to method and apparatus for obtaining measurements and, more particularly, to a method and apparatus of measuring with increased accuracy.

BACKGROUND OF THE INVENTION

Distance measurement devices usually measure short distances with good accuracy or long distances with poor accuracy. Currently devices that can measure with good accuracy or long range are expensive and complicated. The short range measurement devices (i.e., microns to meters range) are usually mechanical or optical. The mechanical devices measure the distances directly and the optical devices measure optical fringes to count the distance to the measurement plane. Long distances are measured most commonly by time of flight and result in centimeter scale resolution.

SUMMARY OF THE INVENTION

Aspects of the present invention include a device comprising: a light source capable of transmitting an outgoing light beam toward a target; a frequency source coupled to the light source and capable of modulating the outgoing light beam; a first beam splitter configured to divide the outgoing light beam; a second beam splitter configured to combine a return ranging light beam from the target and a reference light beam from the first beam splitter; a first detector optically coupled to the second beam splitter and configured to produce a voltage signal; and a second detector coupled to the first detector and configured to determine target distance information from the voltage signal.

Further aspects of the invention include a method comprising: transmitting an outgoing light beam toward a target; modulating the light beam with a first frequency; splitting the outgoing light beam; combining a first return ranging light beam with a first reference light beam; detecting the first return ranging light beam and the first reference light beam and producing a first voltage signal representing distance dependent phase information; and detecting the first voltage signal and determining target distance information from the first voltage signal.

BRIEF DESCRIPTION OF THE DRAWINGS

The accompanying drawings, which are incorporated into and form a part of the disclosure.

DETAILED DESCRIPTION OF THE INVENTION

Figure 1:
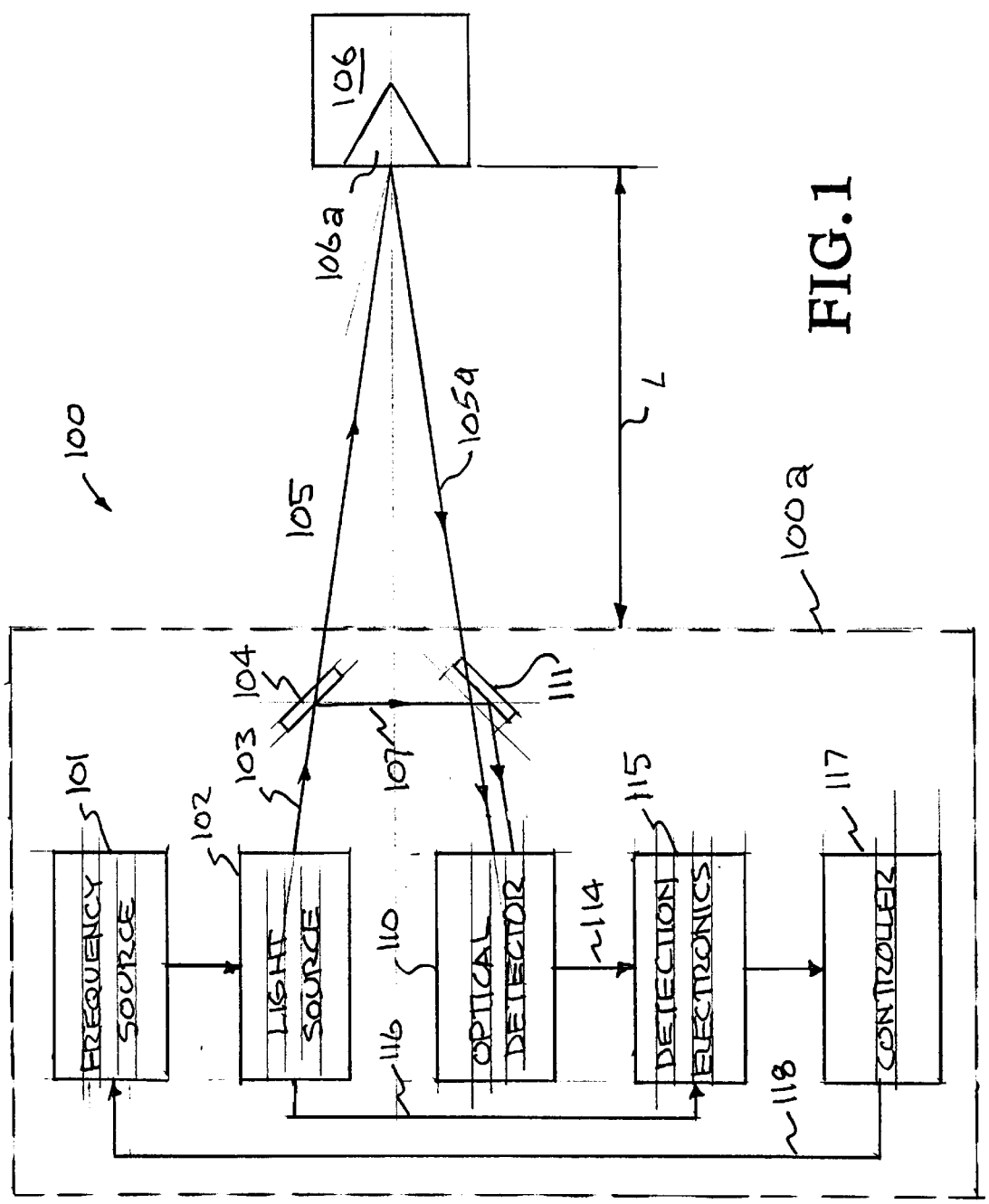
FIG. 1 is a schematic diagram of a first embodiment measurement device having a frequency source which modulates a light source.

FIG. 1 illustrates a distance measurement system or device 100. The distance measurement device 100 includes a housing 100a having a frequency source 101 (e.g., oscillator) producing a sine wave output and capable of amplitude modulating a light source 102 with a modulation frequency f. The frequency source 101 may operate in the frequency range of approximately 1 MegaHertz (MHz) to approximately 2 GigaHertz (GHz). The light source 102 may typically be a laser diode, but in alternative embodiments, a broadband light source such as incandescent lighting or narrowband light source such as a light-emitting diode (LED) may be used. The amplitude-modulated output from the light source 102 is incident on beam splitter 104. The output 103 of beamsplitter 104 is split into two beams 105 and 107. The splitting of the output 103 creates a ranging beam 105 and a reference beam 107. The ranging beam 105 is transmitted out of the housing 100a to a target 106. A return ranging beam is designated by reference numeral 105a and travels back from the target 106 to the housing 100a. The reference beam 107 is not propagated to the target 106, but rather is redirected in the device 100 by beam splitter 104 so as to be redirected by beam splitter (or combined) 111 and combined with the return ranging beam 105a. The reference beam 107 optical propagation distance remains constant and thus allows for a constant reference distance to compare the distance to the target 106 that is transversed by return ranging beam 105a. The distance L between the housing 100a and the target 106 is the distance to be measured by the device 100. Return ranging beam 105a returns from the target 106 either by diffuse reflection from the target 106 itself, by a retroreflector 106a located on the target, or by another means of returning the light to the detector 110. A retroreflector 106a is a reflection source that may be used to obtain greater accuracy and is typically used when the distance to be measured by the device 100 is greater than approximately 50 feet. Upon returning to the apparatus 100, as discussed above, the return ranging beam 105a is combined at beam splitter 111 with beam 107.

The return ranging beam 105a and light beam 107 output from the beam splitter 111 are then incident upon optical detector 110. The optical detector may also be referred to as the first detector for the purposes of this description. The optical detector 110 is a mixing detector which mixes the signals detected from the return ranging beam 105a and reference light beam 107. The optical detector 110 may be a square law detector which outputs a voltage signal proportional to the square of the electric field as a measurement of the optical intensity of the two incoherent beams 105a, 107. Detection electronics 115 are directly coupled to the optical detector 110. Detection electronics 115 may also be referred to as the second detector for the purposes of this description. Detection electronics 115 may include a phase detector and are designed to receive the voltage signal 114 and compare the phase of this voltage signal 114 with the phase of a modulation output signal 116 from light source 102. The detection electronics 115 are then configured to output a phase difference determination to controller 117. The optical detector 110 may be directly coupled to the detection electronics 115 with only an interconnecting electrical line in between because the voltage signal 114 does not require amplification. Amplification is not required because the detection electronics 115 may be designed to detect minimum frequency values and, therefore, frequency difference signal 114 and modulation output signal 116 are not required to have substantially the same strength. Therefore, the modulation output signal 116 may have substantially greater signal strength than the voltage signal 114. The detection electronics 115 are capable of determining the signal strength at the modulation frequency so as to obtain the important information from the optical detector 110 while discarding the unimportant information. After calculating the phase difference between the voltage signal 114 and the modulation output signal 116, the detection electronics 115 will calculate the phase difference to determine the distance L. The detection electronics 115 may include, for example, a lock-in amplifier or a band-pass filter.

The controller 117 is configured to receive the phase difference signal from the detection electronics 115 and calculate the one-way distance L from the housing 100a to the target 106. The controller may be, for example, a microprocessor. The controller 117 is connected through line 118 to control the frequency source 101.

The controller 117 is designed to perform the following calculations to determine the distance L to the target 106. The signal power of the voltage signal 114 sent to the detection electronics 115 will be a minimum when the modulation frequency, f, satisfies the following equation:

$$f=(2m+1)c/4L$$

where m is the wave number of modulation waves in the optical path to and from the target 106 (or also defined as the number of cycles between light source 102 and detector 110) and c is the speed of light in a vacuum. The value of m and L are initially unknown, and therefore, a value to be measured may not be determined. The wave number of modulation, m, may be determined by successively taking at least two readings at two different frequencies. In operation, two readings will be taken successively upon operation of the device 100, for example purposes, by the operator pushing a button (not shown). The controller 117 is configured to control the frequency settings of the frequency source 101 in response to the operator's actions and to process the first and second readings at different frequencies. The two readings at two different frequencies allow the controller 117 to calculate the value of m using the phase difference signal from detector 115. During a first reading, a first difference signal is compared to a first modulation output signal, and during a second reading the second difference signal will be compared to a second modulation output signal. The first and second readings may be taken at frequencies in the range of approximately 1 MHz to approximately 2 GHz. More specifically, the measuring frequencies may be digitally controlled frequencies that are controlled by the controller 117 directly or, in alternative embodiments, the frequencies may be obtained from a linear sweep that are read by the controller 117. Putting the value of m into the following equation yields the value of L and ΔL, a measure of uncertainty in the measured distance:

$$L=(2m+1)c/4f$$

$$\Delta L = \frac{-(2m+1)c\Delta f}{4f^2}$$

where f may be the frequency for either of the first or second readings and Δf is the uncertainty in the modulating frequency. (For greater accuracy in the measurement of L, a third reading may be taken at a third frequency. This third minimum allows for the averaging of noise in the system and improves the accuracy of the distance measurement).

In an alternative embodiment, the velocity of the target 106 at the distance L may also be measured by analyzing a Doppler shift in the detection electronics 115. The detection electronics 115 are constructed to perform this Doppler shift analysis using voltage signal 114. Since the return signal frequency is Doppler shifted in proportion to the velocity of the target 106, the output of the optical detector 110 will be shifted from the original frequency by this Doppler shift. The detection electronics 115 may detect this shift using standard frequency measurement techniques. The velocity of the target 106 will be proportional to this frequency shift. The velocity calculation may be done simultaneously with the distance measurement.

An advantage of the embodiment disclosed in FIG. 1 is that inexpensive optical components may be used to measure distances with greater accuracy than is normally found in commercial surveying equipment and at substantially lower cost. Specifically, measurements may be obtained by the device 100 with an accuracy in the range of approximately 10 micrometers (m) to approximately 100 μm at approximately 5 meters from the target 106 and the accuracy varying by approximately 1 micrometer per meter as measured to the target 106. Therefore, this embodiment may be used effectively in the range of approximately 1 millimeter (mm) to approximately 5 kilometers.

Figure 2:
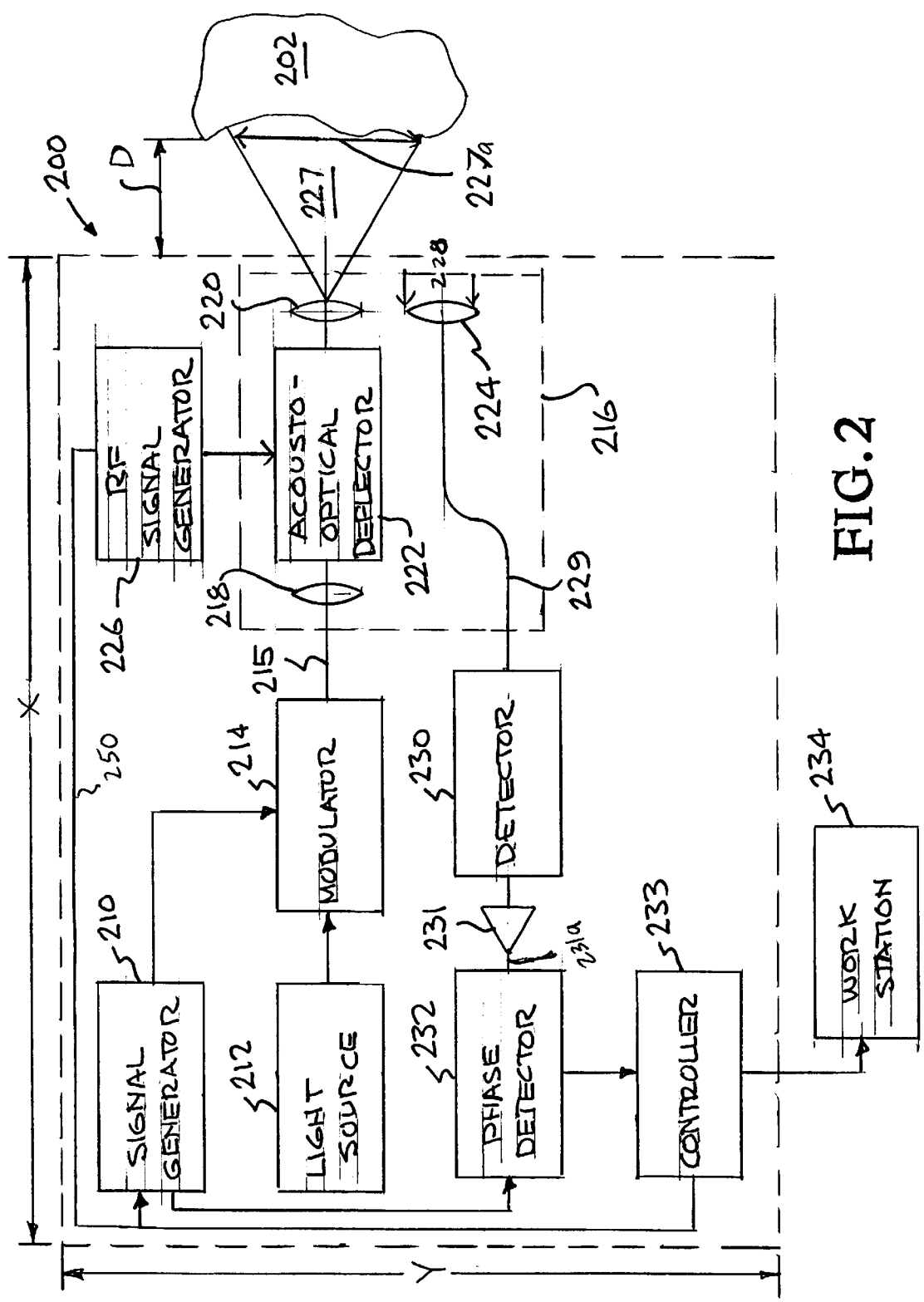
FIG. 2 is a schematic diagram of a second embodiment measurement device.

FIG. 2 illustrates a second embodiment of a measurement device 200 which may determine the distance D to an object or target 202. The device 200 may be designed to be a small package having a length X which may be less than approximately 5 centimeters (cm), height Y which may be less than approximately 2 cm and depth (not shown) which may be less than approximately 2 cm. A light source (e.g., laser diode, LED, incandescent light) 212 either coherent (i.e., light waves all in phase with one another) or incoherent may be modulated in external modulator 214 by a signal generator (or frequency source) 210 (e.g., oscillator). In an alternative embodiment, the light output from light source 212 may be directly modulated without the use of an external modulator 214. Modulator 214 may be, for example, from the group consisting of an acousto-optical (AO) modulator, electro-optical (EO) modulator, Mach-Zender modulator, peizoelectric switch, and a liquid crystal light valve. In operation, a periodic signal (e.g., sine wave, pulsed format) from signal generator 210 is modulated with the light beam from the light source 212 in the modulator 214. The periodic signal may be approximately 2 GHz or greater. The modulated light beam may then be transmitted through a fiber optic cable 215 to a remote head assembly 216.

The remote head assembly 216 includes beam shaping optics 218, an acousto-optical (AO) deflector 222, beam shaping optics 220 and a receiving lens 224. Radio frequency (RF) signal generator 226 may optionally be mounted inside or outside the remote head assembly. The first set of beam shaping optics 218 focus the light signal from the fiber optic cable 215 onto the AO deflector 222. The AO deflector 222 may contain a crystal and a piezoelectric transducer. The AO deflector 222 may be actuated by the voltage controlled or digitally controlled radio frequency (RF) signal generator 226 (e.g., oscillator) coupled to the AO deflector 222. The RF signal generator 226 may operate in the range of approximately 1 MHz to approximately 10 GHz and while shown outside the remote head assembly 216, the RF signal generator 226 may also be mounted inside the remote head assembly 216. The AO deflector 222 is constructed to diffract light off of the sine wave transmitted from the first beam shaping optics 218. This diffraction by the AO deflector 222 controls the light and causes the light to shift to a predetermined angle proportional to the driving frequency produced by the RF signal generator 226. The controller 233 may be used to control the RF signal generator 226 frequency (connection shown by reference numeral 250 in FIG. 2). The diffracted light is transmitted to the second beam shaping optics 220 and a light beam 227 is created which forms a light spot 227a on the target 202 and follows a predetermined pattern as it scans the target 202.

The reflected or diffused light 228 from the object 202 is captured by a receiving lens 224 (which also may be a fiber) and transmitted through a fiber optic cable 229 to a detector 230. Detector 230 may be a fast detector (e.g., capable of detecting signals approximately less than 2 nanoseconds in frequency).

The output of the fast detector 230 is then amplified in amplifier 231. The output of this amplifier 231 is kept at a constant level for frequencies that are low compared to the original modulation frequency produced by the signal generator 210. This may be accomplished by using an automatic gain controlled amplifier with feedback from the output signal 231a or by controlling the transmit output level using feedback from the amplifier 231. The amplified output 231a of the amplifier 231 is transmitted to a phase detector 232 as a RF input. A second input to the phase detector 232 is a signal from the original modulating signal source, signal generator 210, is used as a reference signal by the phase detector 232. The output of the phase detector 232 is transmitted to a controller 233. Controller 233 may be a microprocessor or circuitry configured to control the frequency setting of the signal generator 210, receive readings from the phase detector 232 and perform calculations to determine the one-way distance D. Controller 233 may also be connected to a workstation 234 to display the distance measurements. In alternative embodiments, the controller 233 may be removed and the workstation 234 may be used to control the device 200.

In operation, phase detector 232 measures the phase shift of the output signal 231a with respect to the reference signal produced by signal generator 210 and forwards the result to controller 233. The distance D may be calculated in the controller 233. The equations used in determining the distance D and the measure of uncertainty in the measured distance $\Delta D$ are the following:

$$D = \frac{c(\phi + 2\pi m)}{4\pi f};$$

$$\Delta D = \frac{c\Delta\phi}{4\pi f} + \frac{c(\phi + 2\pi m)\Delta f}{4\pi f^2}$$

where $\phi$ is the phase difference between the output signal 231a and the reference signal from signal generator 210; $\Delta\phi$ is the uncertainty in the phase difference; and $\Delta f$ is the uncertainty in the modulation frequency. As discussed previously with reference to FIG. 1, m may be determined by taking at least two readings at difference frequencies and then using this information to determine the distance D.

In operation, the light spot 227a from the light beam 227 may be scanned around on the object 202 in a one-dimensional or two-dimensional pattern depending on the specific application. This one-dimensional and two-dimensional scanning capability allows for full three-dimensional object profiling of the target 202. The device 200 may be configured to scan in at least two directions which are substantially perpendicular allowing for an area scan without moving the object 202. For example, the light spot 227a from the light beam 227 may be used to conduct both substantially transverse measurement and substantially vertical measurement. The substantially transverse measurement direction may be defined as that direction that is approximately perpendicular to the optical propagation direction of light beam 227. The substantially vertical measurement direction may be defined as that direction that is approximately parallel to the optical propagation direction of the light beam 227. In alternative embodiment, the target 202 may also be translated in any direction (e.g., substantially horizontal, substantially vertical) with respect to the light beam 228 or rotated to facilitate the scanning process.

The device 200 may be used to measure the distance to each measured point on the target 202 with an accuracy of less than approximately 1 $\mu$m and, typically, less than approximately 100 nanometers (nm). The transverse measurement accuracy is determined by the spot size 227a and is nominally in the range of 1 $\mu$m to 1 mm. In operation, a linear scan of over approximately 5 to approximately 15 centimeters (cm) per detector 200 and, typically, approximately 8 cm per detector may be possible.

The device 200 may be self-calibrated using symmetrical detectors. Two optical detectors 200 may be used to measure the distance between each other by pointing the two at each other. Then a thin, well-calibrated target 202 may be placed in between the two detectors 200. The exact position and thickness of this target 202 may be calculated and verified with these measurements. Subsequently all other targets 202 placed inside the measurement area are measured to the same calibration accuracy as was made in the previous measurements.

Figure 3:
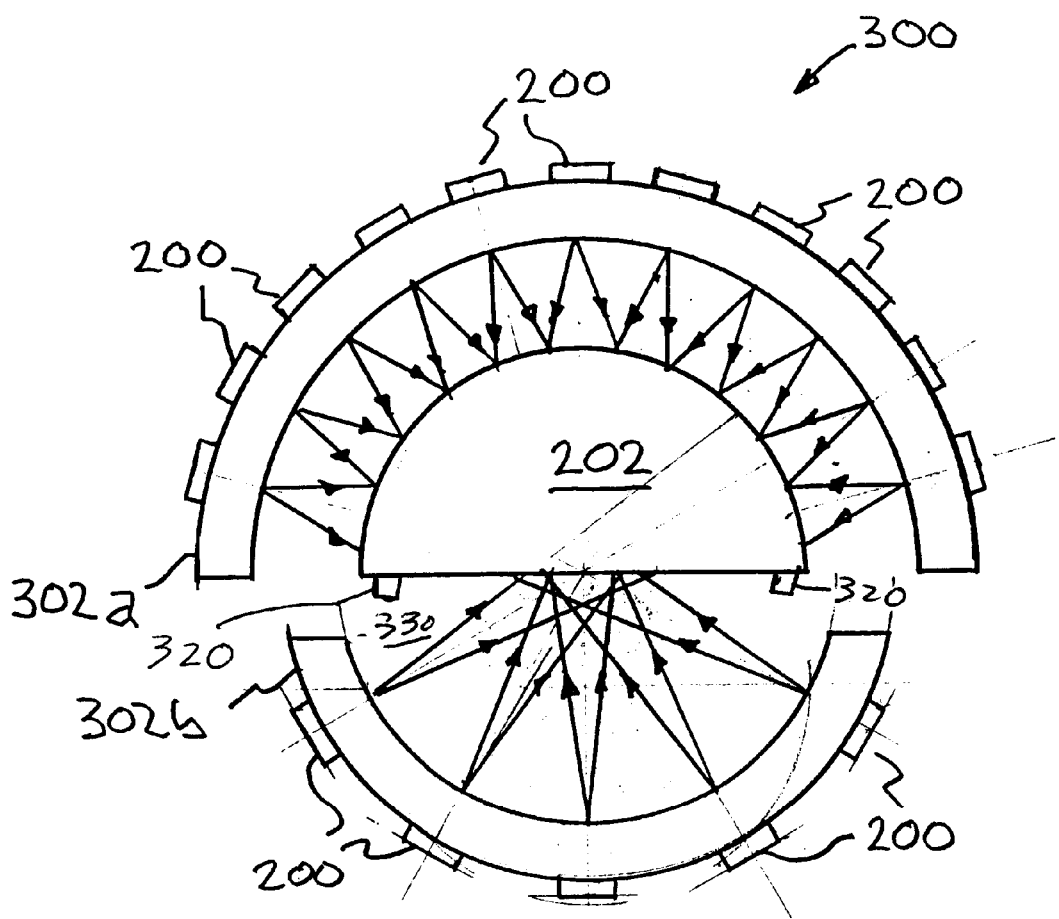
FIG. 3 is a cross-sectional diagram of a modular system incorporating a plurality of the second embodiment measurement devices.

Since the device 200 is modular in format it is possible to combine a plurality of devices 200 into one modular system 300 that may scan many positions of the target 202 mounted in a target chamber 330 as shown in FIG. 3. The modular system 200 design allows for a plurality of devices 200 to be operated simultaneously to improve the speed of measurement. A plurality of devices 200 may be mounted on an upper mounting section 302a and below the target 202 on a lower mounting section 302b. The number of devices on each of the mounting sections 302a, 302b may range in number from one on each mounting section to at least ten on each mounting section. Each of the mounting sections 302a, 302b may have a substantially arcuate shape as shown by FIG. 3. Each of the modulation frequencies of the devices 200 may be different to avoid crosstalk between the devices 200 and allow for simultaneous operation. The target 202 may be rotated on a mounting device 320 or the upper and lower sections 302a, 302b may be rotated together or separately to increase the speed of the scanning operation. Each device 200 may measure areas of up to and including approximately 5 cm by 5 cm of the target 202 with substantially transverse measurement accuracies less than approximately 50 $\mu$m and substantially vertical measurement accuracies of less than approximately 500 nm.

The measuring device 200 disclosed herein may be used in measuring small parts accurately (e.g., parts less than approximately 1 mm). Examples include computer disk parts, electrical assemblies, microchip inspection, circuit board inspection and general factory line inspection that require tight tolerances. However, the measuring device 200 is not limited to small size applications, and may be used in large automotive parts, industrial machinery, building inspection, Amplitude Modulated Light Detection and Ranging (AM LIDAR), distance measurement, modulated optical distance measurement, and survey instruments.

The foregoing is illustrative of the present invention and is not to be construed as limiting thereof. The invention is defined by the following claims, with equivalents of the claims to be included therein.

What is claimed is:

1. A device comprising:
   a light source capable of transmitting an outgoing light beam toward a target;

a frequency source coupled to said light source and capable of modulating the outgoing light beam at a modulation frequency;

a first beam splitter configured to divide the outgoing light beam;

a second beam splitter configured to combine a return ranging light beam from said target and a reference light beam from said first beam splitter;

a first detector optically coupled to said second beam splitter and configured to incoherently sum the return ranging light beam and the reference beam and produce a voltage signal representing the incoherent summation;

a second detector coupled to the first detector and configured to detect a minimum signal strength of said voltage signal at the modulation frequency; and a controller coupled to said second detector and adapted to determine the distance to said target using at least two different modulation frequencies of said frequency source associated with minimum signal strengths.

2. The device of claim 1, wherein said controller is configured to vary the frequency settings of said frequency source.

3. The device of claim 1, wherein said first detector and second detector are directly coupled.

4. The device of claim 1, wherein said first detector is an optical mixing detector.

5. The device of claim 1, wherein said first detector is a square law detector.

6. The device of claim 1, wherein said second detector is a phase detector.

7. The device of claim 1, wherein said second detector receives a modulation signal from said light source.

8. The device of claim 2, wherein said controller is configured to vary the frequency settings between approximately 1 MiHz to approximately 2 GHz.

9. The device of claim 2, wherein said controller is configured to determine the distance to said target using at least three different frequency settings associated with minimum signal strengths.

10. The device of claim 2, wherein said controller is capable of determining the velocity of the target by using a Doppler shift of at least two frequency readings.

11. The device of claim 1, wherein the frequency source operates in the range of approximately 1 MHz to approximately 2 GHz.

12. The device of claim 1, wherein no amplifier is located between said first detector and said second detector.

13. The device of claim 7, wherein said modulation signal is substantially greater in magnitude than said voltage signal.

14. A device comprising:

a light source capable of transmitting an outgoing light beam toward a target;

a frequency source coupled to said light source and capable of modulating the outgoing light beam at a modulation frequency;

a first beam splitter configured to divide the outgoing light beam;

a second beam splitter configured to combine a return ranging light beam from said target and a reference light beam from said first beam splitter;

detector means optically coupled to said second beam splitter for incoherently summing the return ranging light beam and the reference light beam and detecting a null in power of the incoherent summation at the modulation frequency; and a controller coupled to said detector means and configured to vary the frequency settings of said frequency source and determine the distance to the target using at least two different frequency settings associated with nulls in power.

15. A device comprising:

a means for transmitting an outgoing light beam toward a target;

a means for modulating the outgoing light beam at a modulation frequency;

a first beam-splitting means for splitting the outgoing light beam;

a second beam-splitting means for combining a return ranging light beam and a reference light beam from said first beam-splitting means;

a means for incoherently summing said return ranging light beam and said reference light beam and producing a voltage signal representing the incoherent summation;

means for detecting a minimum signal strength of said voltage signal at the modulation frequency; and a means for determining target distance information using at least two different modulation frequencies of the modulation means associated with minimum signal strengths.

16. A method comprising:

(a) transmitting an outgoing light beam toward a target;

(b) modulating said light beam with a modulation frequency;

(c) splitting said outgoing light beam;

(d) combining a return ranging light beam with a reference light beam;

(e) incoherently summing said return ranging light beam and said reference light beam and producing a voltage signal therefrom representing the incoherent summation;

(f) detecting said voltage signal and determining a signal strength thereof at the modulation frequency;

(g) repeating steps (a) through (f) at least once for different modulation frequencies; and (h) determining the distance to said target using at least two different modulation frequencies associated with minimum signal strengths.

17. The method of claim 16, further comprising:

performing a Doppler shift analysis to determine a velocity of the target.

18. The method of claim 16, further comprising:

transmitting said voltage signal from a first detector, adapted for the incoherent summation, to a second detector, adapted to detect said voltage signal and determine a signal strength, without amplification.

19. The method of claim 16, wherein said modulation frequency is in the range of approximately 1 MHz to approximately 2 GHz.

* * * * *